(12) United States Patent
Hasegawa

(10) Patent No.: US 10,881,238 B2
(45) Date of Patent: Jan. 5, 2021

(54) SAFETY CAP ASSEMBLY AND A PRESSURE COOKER PROVIDED THEREWITH

(71) Applicant: Tom Hiroshi Hasegawa, Gardena, CA (US)

(72) Inventor: Tom Hiroshi Hasegawa, Gardena, CA (US)

( * ) Notice: Subject to any disclaimer, the term of this patent is extended or adjusted under 35 U.S.C. 154(b) by 231 days.

(21) Appl. No.: 15/982,533

(22) Filed: May 17, 2018

(65) Prior Publication Data

US 2018/0332994 A1 Nov. 22, 2018

Related U.S. Application Data

(60) Provisional application No. 62/508,902, filed on May 19, 2017.

(51) Int. Cl.
*A47J 27/09* (2006.01)
*A47J 27/092* (2006.01)

(52) U.S. Cl.
CPC ............ *A47J 27/092* (2013.01); *A47J 27/09* (2013.01)

(58) Field of Classification Search
CPC ................................ A47J 27/092; A47J 27/09
See application file for complete search history.

(56) References Cited

U.S. PATENT DOCUMENTS

| 4,803,919 | A | * | 2/1989 | Fritsch | ................... | A47J 27/08 |
|---|---|---|---|---|---|---|
| | | | | | | 99/340 |
| 7,726,508 | B2 | | 6/2010 | Hasegawa | | |
| 8,302,800 | B2 | | 11/2012 | Hasegawa | | |
| 8,869,829 | B2 | | 10/2014 | Hasegawa | | |
| 2004/0129705 | A1 | * | 7/2004 | Hasegawa | ............... | A47J 27/09 |
| | | | | | | 220/316 |
| 2010/0193521 | A1 | * | 8/2010 | Hasegawa | ............... | A47J 27/09 |
| | | | | | | 220/316 |

(Continued)

FOREIGN PATENT DOCUMENTS

| CN | 86200398 U | 10/1986 |
|---|---|---|
| EP | 0249572 A1 | 12/1987 |
| EP | 2397052 A1 | 12/2011 |

(Continued)

OTHER PUBLICATIONS

Office Action dated Sep. 23, 2019 to corresponding EPC Patent Application No. 18 173 112, citing foreign patent document listed above.

(Continued)

*Primary Examiner* — Jun S Yoo
(74) *Attorney, Agent, or Firm* — Norton Rose Fulbright US LLP

(57) ABSTRACT

A safety cap assembly to be installed in the lid of a cooking appliance such as a pressure cooker and comprising a pressure release tube having a flange portion at its lower end, a cap securing nut with its outer diameter gradually increasing from the top end to the lower end and provided on the flange portion of the cap securing nut, and a safety cap unit which includes a mesh casing and a supporting bridge in a shallow reversed V-shape and is mounted to the lower portion of the pressure release tube. The safety cap assembly can be installed along with a vacuum adapter including a clogging ball inside to create a vacuum environment inside the pressure cooker.

12 Claims, 12 Drawing Sheets

(56) References Cited

U.S. PATENT DOCUMENTS

2013/0199633 A1\* 8/2013 Hasegawa ........... F16K 37/0058
                                                                               137/511
2013/0199635 A1\* 8/2013 Hasegawa ............... A47J 27/09
                                                                               137/535

FOREIGN PATENT DOCUMENTS

| JP | 59-176414 U | 1/1988 |
| JP | 63-023628 A | 1/1988 |

OTHER PUBLICATIONS

Office Action (Notice of Reasons for Refusal) dated Jun. 18, 2019 to corresponding Japanese Patent Application No. 2018-097078, citing the foreign patent document listed above.
Canadian Office Action dated Feb. 26, 2019 issued for CA 3,005,537.
European Search Report dated Sep. 24, 2018 issued for EP18173112. 6.

\* cited by examiner

SAFETY CAP ASSEMBLY AND A PRESSURE COOKER PROVIDED THEREWITH

CROSS REFERENCES TO RELATED APPLICATIONS

This patent application claims the benefit of U.S. Provisional Application Ser. No. 62/508,902 filed May 19, 2017, which is being incorporated by reference herein.

BACKGROUND OF THE INVENTION

1. Field of the Invention

The present invention relaters to a safety cap for a cooking appliance and more specifically to a safety cap assembly for a pressure cooker and a pressure cooker provided with the safety cap assembly.

2. Description of the Related Art

A pressure cooker that utilizes high-temperature and high-pressure steam to cook the food inside a cooking pot (or inside the cooking cavity) has been well known and used widely. Unfortunately, there is an omnipresent risk of explosion that is caused by too much pressure of the inside of the pot of a pressure cooker.

One way to prevent this risk is to use a safety cap that covers a safety valve installed in a lid of a pressure cooker to release an excessive pressure of the inside of the pot. A safety cap attached to the lower end of the interior portion of the safety valve prevents food particles from entering into the safety valve, thus avoiding the valve from being clogged by the food particles and preventing explosion of the pressure cooker caused by the clogged food particles in the valve.

The safety cap works well to prevent clogging of the safety valve (or the pressure release valve), and therefore it prevents the explosion of pressure cookers, providing a safety and secure use of pressure cookers. Nonetheless, users occasionally remove the safety cap from the lid for cleaning the pressure cooker, and as a result, it could happen that a user forgets to put the safety cap back on the pressure release valve or fails to make a complete attachment of the safety cap back onto the pressure release valve, leading to eventual undesired consequences.

SUMMARY OF THE INVENTION

Accordingly, it is an object of the present invention to provide a safety cap assembly that is simple in structure and is capable of being easily and securely attached to and removed from the lid of a pressure cooker, so that it can be cleaned with ease and that without the safety cap assembly mounted on a pressure cooker, particularly on the lid of a pressure cooker, it is not ready to be used as a pressure cooker, thus assuring high level of sanitation and safety for pressure cooker cooking.

It is another object of the present invention to provide a safety cap assembly that is used for vacuum cooking in which the inside (cooking cavity) of a cooking pot is vacuumed and foodstuff inside is processed in such a vacuum environment of the inside of the cooking pot.

The above object is accomplished by a unique structure of the present invention for a safety cap assembly that comprises:

a pressure release tube that has therein an axially extending pressure release channel and an outwardly extending flange portion at its lower end, a cap securing nut which is substantially in a truncated cone shape with its outer diameter gradually increasing from the top end to the bottom end and is configured to be attached to the lower portion of the pressure release tube, and a safety cap unit comprised of a mesh casing with a supporting bridge and is configured to be attached to the lower portion of the pressure release tube, a central portion of the supporting bridge being substantially outside of the mesh casing and held by the cap securing nut and the flange portion of the pressure release tube.

The safety cap assembly structured as described above is mounted to the lid of a cooking appliance, particularly to the lid of a pressure cooker with an attachment adapter of the present invention. The attachment adapter is secured to the lid of a pressure cooker, and it is comprised of an annular attachment nut and a sliding lock key slidably installed in the annular attachment nut. The sliding lock key is an L-shaped elongated plate having a circular guide opening and a linear lock opening that continuously formed from the circular guide opening. The safety cap assembly is held on the lid of a pressure cooker with its cap securing nut engaged with the attachment nut of the attachment adapter and by sliding the sliding lock key, so that the pressure release tube of the safety cap assembly is engaged with the linear lock opening of the sliding lock key. The safety cap assembly is easily removed from the lid of the pressure cooker by sliding back the sliding lock key to allow the pressure release tube to be disengaged from the sliding lock key.

As seen from the above, the safety cap assembly is simple in structure with a small number of parts, and thus manufacturing thereof can be easily done. The safety cam assembly can be easily mounted to the lid of a pressure cooker and removed therefrom; and thus cleaning thereof can be done easily. In addition, unless the safety cap assembly is attached to the lid of a pressure cooker, a pressure adjustment weight is unable to be mounted on the safety cap assembly, and as a result, a pressure cooker is not configured. Accordingly, such accidents that a user fails to attach the filtering device, which is a mesh casing (or the safety cap assembly), or to completely mount the filtering device, to the lid of a pressure cooker can be prevented and therefore explosion of pressure cooker is prevented as well.

In addition, since the safety cap assembly is mounted to the lid of a pressure cooker with its securing nut (of a truncated cone shape) snugly engaged with the attachment nut of the attachment adapter, the inside of the pressure cooker is well sealed and isolated from the outside. Therefore, by connecting a vacuum adapter (instead of a pressure adjustment weight) to the safety cap assembly, the inside of the pressure cooker can be vacuumed, and vacuum cooking can be performed for the foodstuff placed in pressure cooker. Currently known cooking method that utilizes a vacuum environment uses pouches. Foodstuff (with seasonings) is put in a pouch, the pouch is then vacuumed and sealed, and this vacuumed pouch with the foodstuff inside is placed in the water of a cooking pot. The water is then heated to cook the foodstuff in the vacuumed pouch. In the present invention, the vacuum cooking is performed inside the vacuumed pressure cooker without using pouches.

DETAILED DESCRIPTION OF THE INVENTION

Figure 1A:
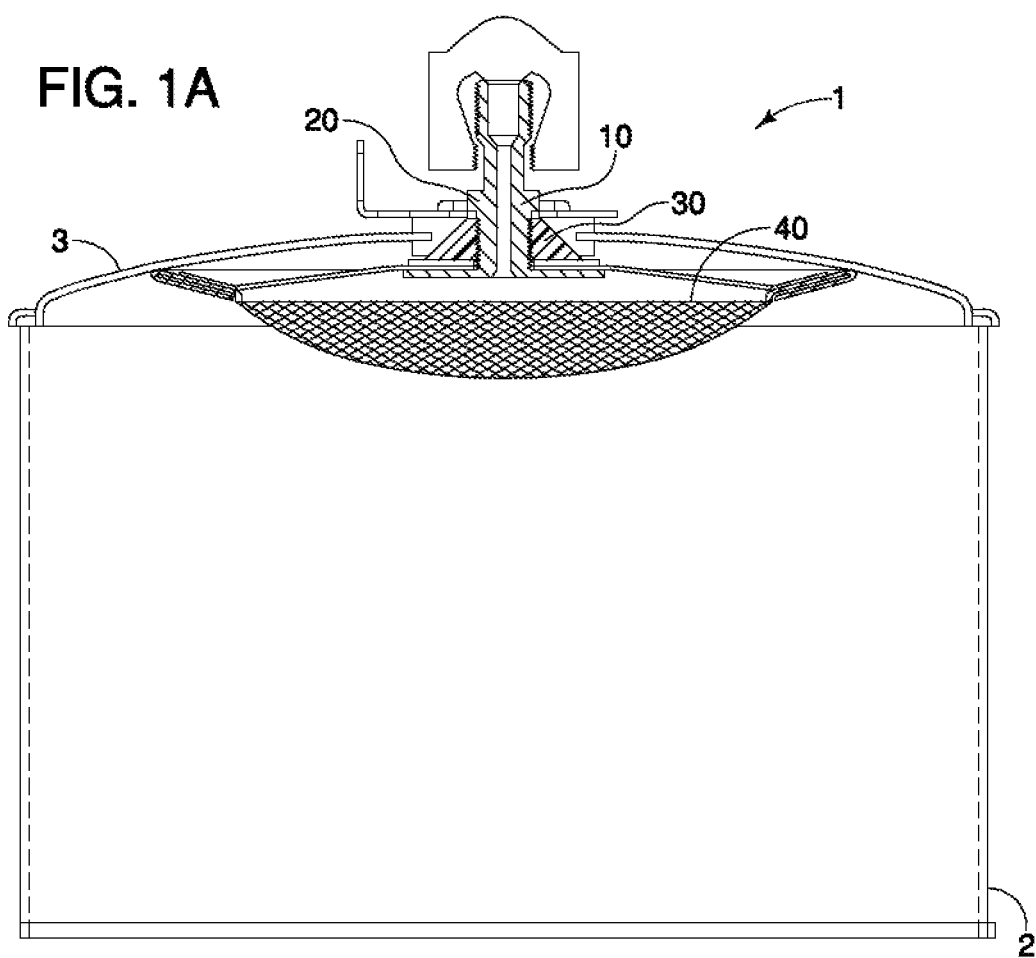
FIG. 1A is a schematic cross-sectional illustration of a pressure cooker with a safety cap assembly according to one embodiment of the present invention installed in a lid thereof.

A safety cap assembly of the present invention for cooking appliances such as a pressure cooker is, as seen from FIG. 1A, configured to be installed in the lid of a pressure cooker. The pressure cooker 1 is comprised of a pot 2 and a lid 3 that covers the pot 2, and a safety cap assembly 10 is installed in an attachment opening formed in the lid 3.

The pressure cooker 1 for which the safety cap assembly of the present invention is typically used (but not limited to) is the one which is made of a stainless steel, withstands the pressure of 100 PSI (pound per square inch) and can be vacuumed up to $10^{-8}$ Pa (Pascal), with a depth of 20-24 inches and a diameter of 20-30 inches, thus of 50-64 gal. capacity.

Figure 1B:
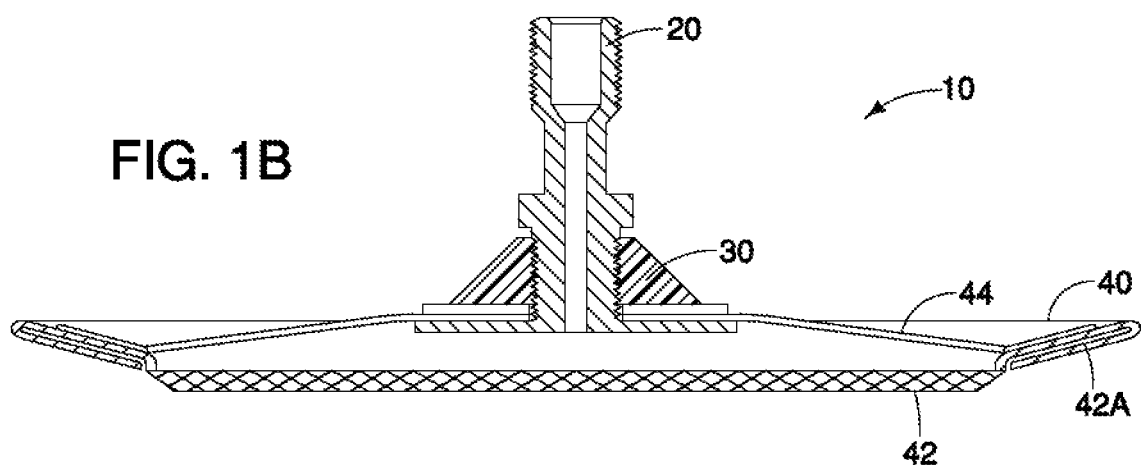
FIG. 1B is a schematic cross-sectional view of a safety cap assembly according to another embodiment the present invention.

As seen from FIG. 1B, the safety cap assembly 10 is comprised of a pressure release tube 20, a cap securing nut 30, and a safety cap unit 40.

Figure 2:
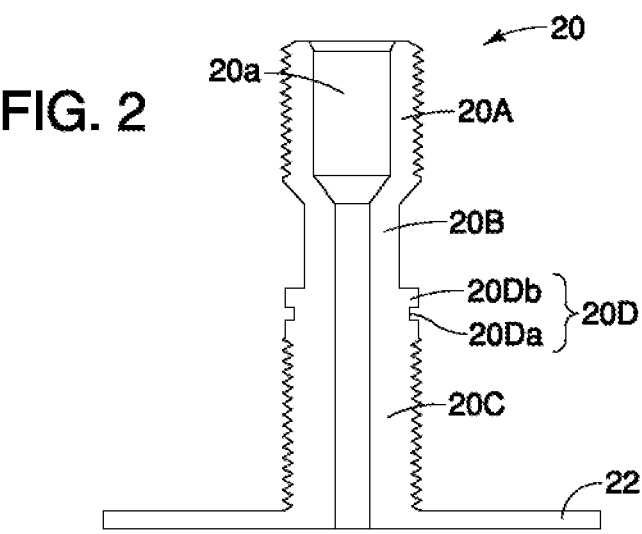
FIG. 2 shows a pressure release tube of the safety cap assembly of the present invention illustrated in cross-section.

As shown in FIG. 2, the pressure release tube 20 is a hollow, cylindrical tube that is made of, for instance, stainless steel; and it is formed therein with an axially extending pressure release channel 20a that opens at one (top) end and at another (lower) end so that it can release the internal pressure of a pressure cooker. The pressure release tube 20 is comprised of a connecting section 20A at its upper portion, a fixing section 20C at its lower portion and a middle section 20B at its middle portion or between the connecting section 20A and the fixing section 20C. The connecting section 20A has a slightly larger outer diameter than the middle section 20B and is externally threaded, so that a pressure release weight (not shown) can be threadedly connected thereto. The fixing section 20C has the same as or a slightly larger outer diameter than the connecting section 20A and is externally threaded, so that a cap securing nut 30 is threadedly engaged therewith. The fixing section 20C is formed with a supporting flange portion 22 at its lower end so that the flange portion 22 extends outwardly to have a larger diameter than the fixing section 20C.

The pressure release tube 20 further includes a locking section 20D. The locking section 20D is provided between the middle section 20B and the fixing section 20C and is comprised of a locking groove 20Da and an outwardly extending locking flange portion 20Db. The locking flange portion 20Db and the locking groove 20Da are formed so that the external diameter of the locking flange portion 20Db is the same as or slightly smaller than that of the connecting section 20A and that of the fixing portion 20C, and the external diameter of the locking groove 20Da is smaller than that of the locking flange portion 20Db.

Figure 3:
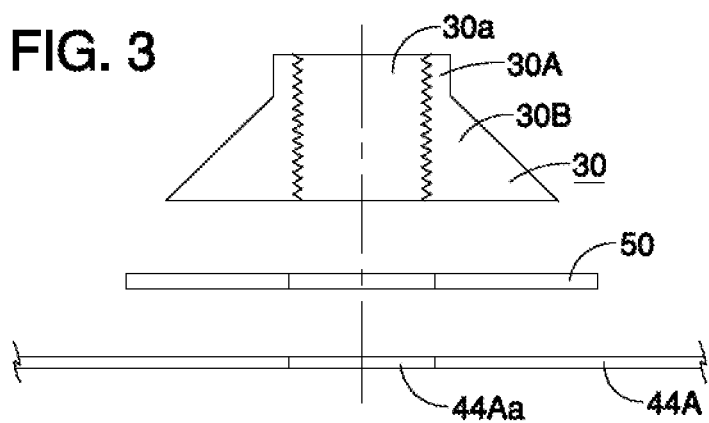
FIG. 3 shows a cap securing nut, a washer, and a supporting bridge which is attached to a mesh casing of the safety cap nut, illustrated in cross-section.

As seen from FIG. 3, the cap securing nut 30 is substantially a truncated cone shape nut so that it has a trapezoidal shape when viewed from the side. The cap securing nut 30 is formed therein with an axially extending central bore 30a that opens at one (top) end and at another (lower) end thereof. The diameter of the central bore 30a of the cap securing nut 30 is substantially the same as that of the external diameter of the fixing section 20C of the pressure release tube 20.

This central bore 30a is formed with a thread, so that this internally formed thread engages with the externally formed thread of the fixing section 20C of the pressure release tube 20 (see FIG. 2) and so that the cap securing nut 30 is threadedly secured to the lower portion of the pressure release tube 20 on the flange portion 22 of the pressure release tube 20.

The cap securing nut 30 is preferably made from, for instance, silicon (or materials having some degree of elasticity, and it can be made of stainless steel as well). The cap securing nut 30 is comprised of a cylindrical section 30A in the top portion that has a vertically consistent outer diameter and a skirt section 30B that extends from the lower end of the cylindrical section 30A towards the lower end of the cap securing nut 30. The cap securing nut 30 thus takes, as a whole, a truncated cone shape.

The skirt section 30B of the cap securing nut 30 thus has a slanted circumferential exterior surface that is about 60 degrees with respect to its bottom face. The skirt section 30B thus has an external diameter which is smallest at the top end and the largest at the bottom end. The height of the cap securing nut 30 is substantially the same as that of the fixing section 20C of the pressure release tube 20. The external diameter of the bottom or the lower end of the cap securing nut 30 of the skirt section 30B is substantially the same as that of the external diameter of the supporting flange portion 22 of the pressure release tube 20.

Figure 4:
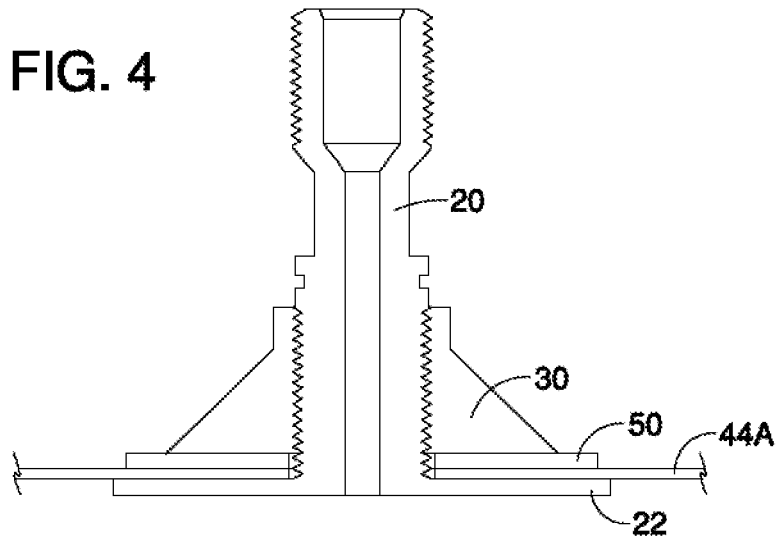
FIG. 4 shows of the pressure release tube with the cap securing nut and the supporting bridge mounted thereon, illustrated in cross-section.

The pressure release tube and the cap securing nut shown in FIGS. 8A through 9A take a slightly different configuration from those shown in FIGS. 2 through 4. The fixing section 20C of pressure release tube 20 of FIG. 8A (8B) is partially threaded in terms of vertical direction, so that the upper part 20Ca is threaded externally with the lower part 20Cb not threaded.

Figure 9:
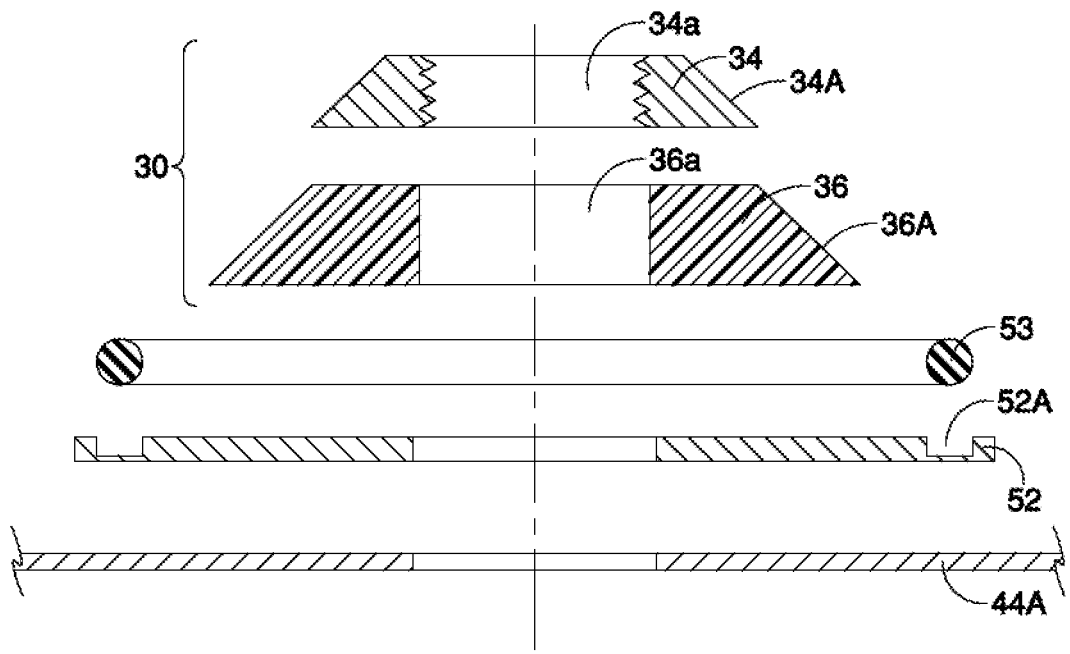
FIG. 9 is a disassembled cross-sectional view of the safety cap assembly of FIG. 8A.
Figure 9A:
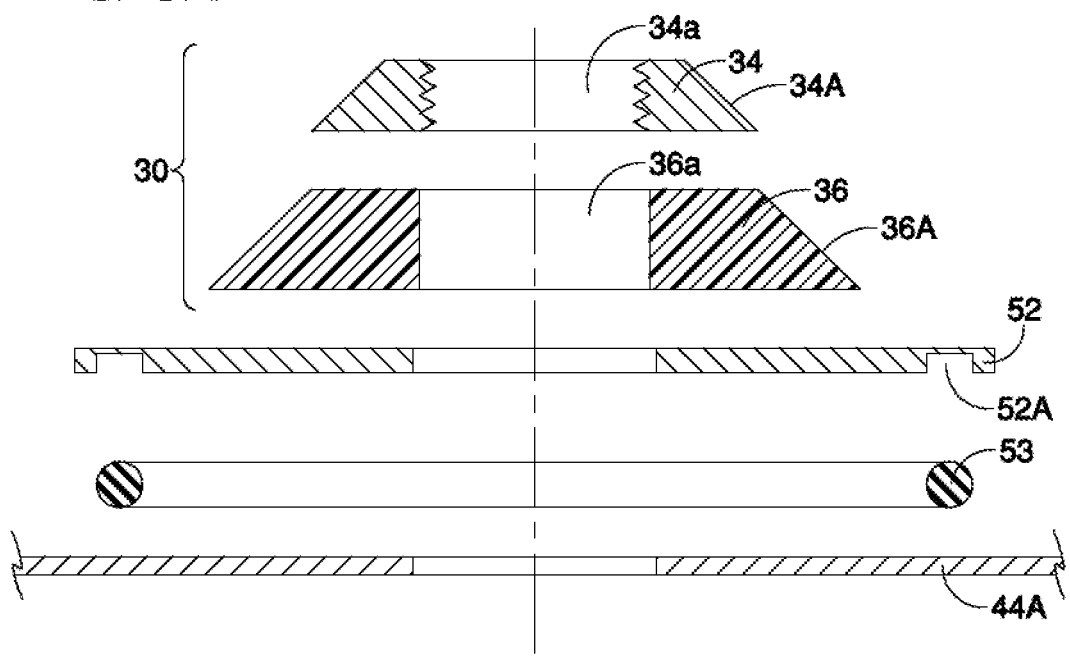
FIG. 9A is a disassembled cross-sectional view of a safety cap assembly in which some elements are arranged differently from the structure of FIG. 9.

As seen from FIG. 9, the cap securing nut 30 is comprised of two elements, an upper nut element 34 and a lower nut element 36. The upper and lower nut elements 34 and 36 take a substantially truncated cone shape, respectively, taking a trapezoidal shape when viewed from the side, with the outer diameter of each of the upper and lower nut elements gradually increases from the top end to the bottom end. The cap securing nut 30 formed by these upper and lower nut elements, when combined with each other, takes as a whole a truncated cone shape that has a trapezoidal shape when viewed from the side so that the outer diameter of the cap securing nut 30 as a whole gradually increases from the top end of the upper nut element 34 to the bottom end of the lower nut element 36. In other words, the diameter of the bottom of the upper nut element 34 is the same as the diameter of the top of the lower nut element 36, so that their circumferential surfaces 34A and 36A make a single flush surface when the upper and lower nut elements 34 and 36 are combined with the upper nut element 34 on top of the lower nut element 36.

The upper and lower nut elements 34 and 36 are formed with axially extending central bore 34a and 36a that open at one (top) end and at another (lower) end. The diameters of these central bores are substantially the same as that of the external diameter of the fixing section 20C of the pressure release tube 20.

The central bore 34a of the upper nut element 34 is threaded, so that this internal thread engages with the externally formed thread of the upper part 20Ca of the fixing section 20C of the pressure release tube 20. The central bore 36a of the lower nut element 36 is substantially the same in diameter as that of the external diameter of the lower part 20Cb of the fixing section 20C of the pressure release tube 20, so that the lower nut element 36 snugly fitted threadedly on the lower part 20Cb. The cap securing nut 30 thus comprising the upper and lower nut elements 34 and 36 is secured to the fixing section 20C of the pressure release tube 20 on its flange portion 22 when the upper nut element 34 is threaded to the upper part 20Ca of the pressure release tube 20 with the lower nut element 36 underneath as seen from FIG. 8A.

The upper nut element 34 is made of, for instance, stainless steel, and the lower nut element 36 is made from, for instance, silicon or materials that have some degree of elasticity.

The slanted circumferential surfaces of the upper and lower nut elements 34 and 36 take about 60 degrees with respect to the bottom faces. The combined height of the upper and lower nut elements 34 and 36 is substantially the same as that of the fixing section 20C of the pressure release tube 20. The external diameter of the bottom or the lower end of the lower nut element 36 is substantially the same as (or less than) that of the external diameter of the supporting flange portion 22 of the pressure release tube 20.

Figure 5:
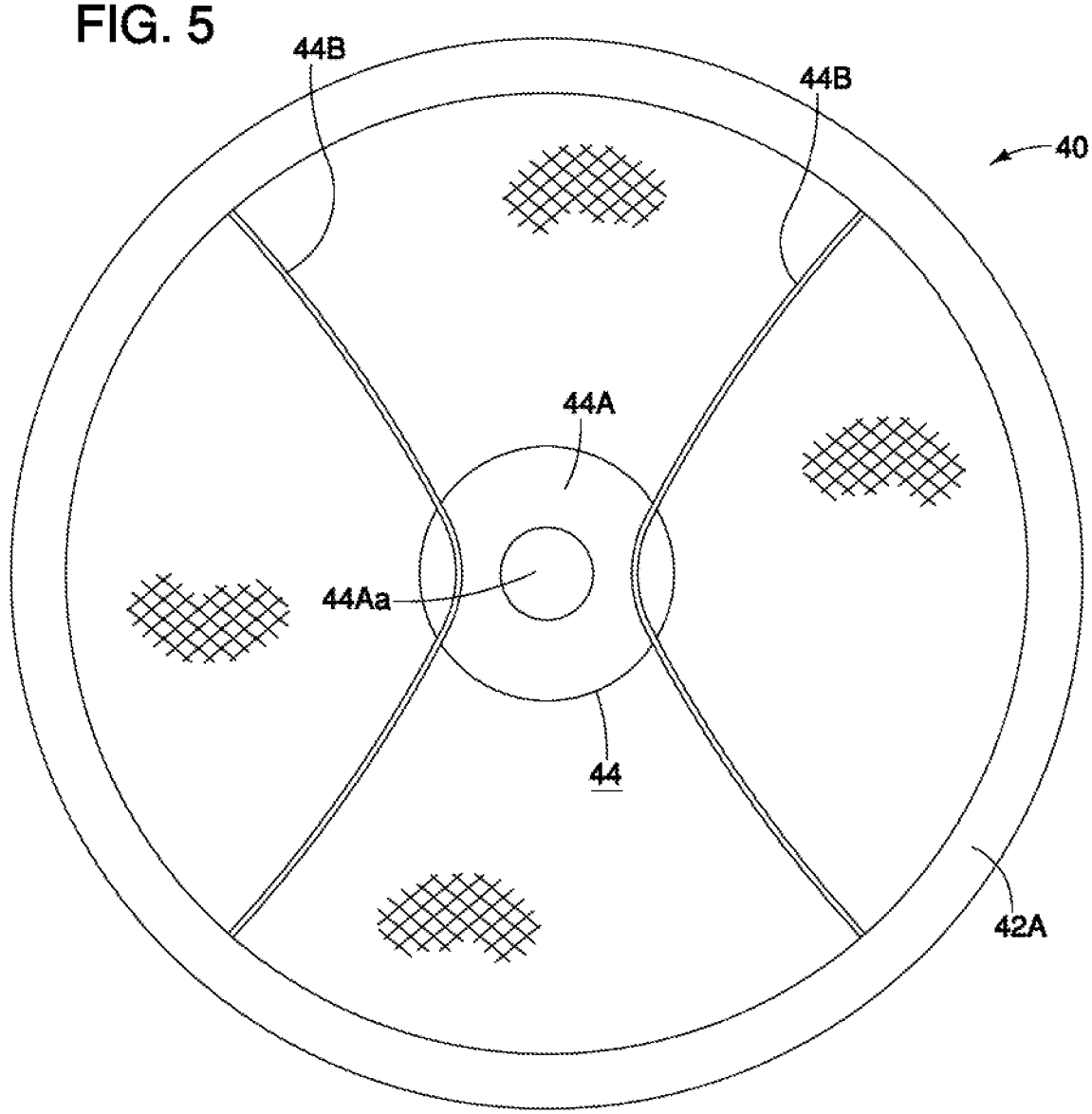
FIG. 5 is a top view of a safety cap unit according to the present invention.
Figure 6:
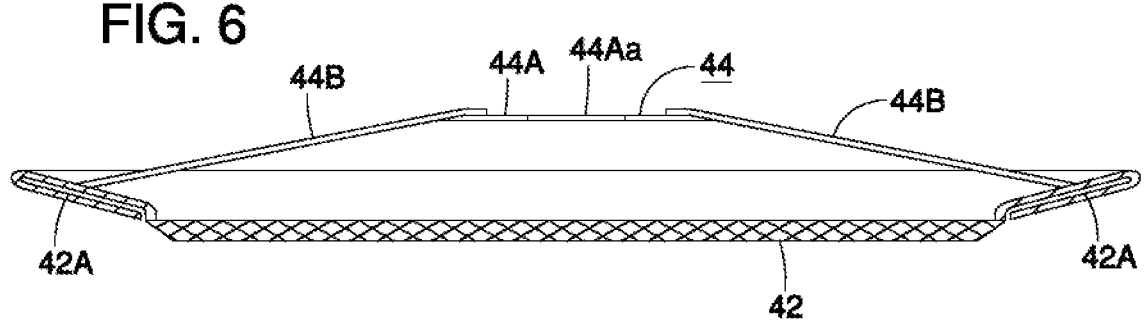
FIG. 6 is a side view of a safety cap unit having a flat-bottom mesh casing according to the present invention.

The safety cap unit 40 is, as seen from FIGS. 5 and 6, comprised of a mesh casing 42 and a supporting bridge 44 that is attached to the mesh casing 42 which has an empty space inside. The mesh casing 42 is made of a metal mesh (SS 304 wire mesh, for instance), and it is a flat bottomed and is thus a relatively shallow casing. The size of each openings (mesh) of the mesh casing is smaller than the inner diameter of the axially extending pressure release channel 20a of the pressure release tube 20. A reinforcing circular frame 42A is fixed to the upper circumferential edge of the mesh casing 42.

To this mesh casing 42, the supporting bridge 44 is attached. As shown in FIGS. 5 and 6, the supporting bridge 44 is a combination of a supporting disk 44A and a pair of supporting rods 44B. In other words, as seen from FIG. 5, the supporting bridge 44 is comprised of the pair of supporting rods 44B attached to the supporting disk 44A. The supporting rods 44B are, as seen from FIG. 6, bent upwardly at their central portions to take substantially a shallow reversed V-shape when viewed from the side; and to these central bent portions, the supporting disk 44A is attached by, for instance, welding at their central portions. The central portions can be under surface of the supporting disk 44A. Both ends of each of the bent supporting rods 44B are attached to the circular frame 42A fixed to the mesh casing 42 by, for example, welding, so that the supporting bridge 44 substantially diametrically bridges the mesh casing 42 or its circular frame 42A. As a result, the supporting bridge 44 or at least the supporting disk 44A attached to the central portions of the upwardly bent supporting rods 44B is located at or above the upper edge level of the mesh casing 42 or the outside of the mesh casing 42.

In the shown embodiment, the pair of supporting rods 44B are symmetrically C-shaped when viewed from above as seen from FIG. 5; however, they can be straight and parallel to each other.

An attachment hole 44Aa, which is larger in diameter than the outer diameter of the connecting section 20A, middle section 20B and fixing section 20C of the pressure release tube 20 but is smaller in diameter than the outer diameter of the flange portion 22 of the pressure release tube 20, is opened in the supporting disk 44A.

Figure 7:
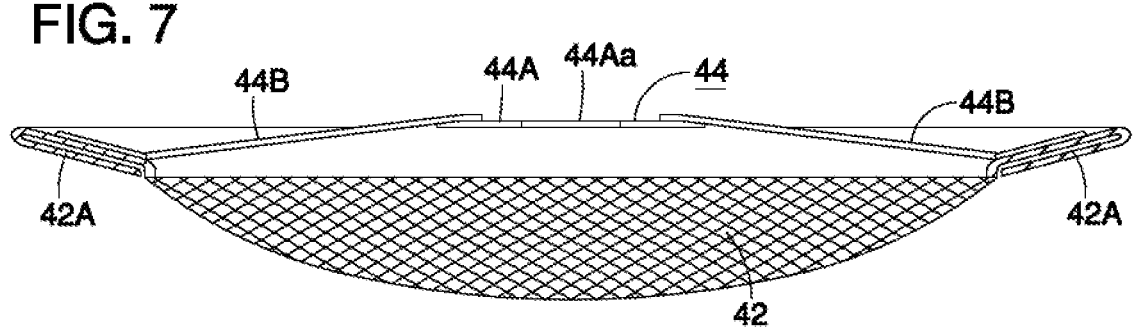
FIG. 7 is a side view of a safety cap unit having a dome shaped mesh casing according to the present invention.

The mesh casing 42 of the safety cap unit 40 can take a dome shape as shown in FIG. 7. In this dome shape mesh casing 42 as well, the supporting rods 44B substantially diametrically bridges the mesh casing 42 or its circular frame 42A, and the supporting bridge 44 or at least the supporting disk 44A attached to the central portions of the bent supporting rods 44B is located at or above the upper edge level of the mesh casing 42 or the outside of the mesh casing 42.

With the structure above, the pressure release tube 20 or its connecting section 20A is aligned with the attachment hole 44Aa of the supporting disk 44A and inserted thereinto, so that the supporting disk 44A is placed on the flange portion 22 of the pressure release tube 20. A gasket 50 (see FIG. 3) is (optionally) placed on the supporting disk 44A. The cap securing nut 30 is next threadedly attached to the fixing section 20C of the pressure release tube 20, so that it holds the supporting disk 44A of the supporting bridge 44 on the supporting flange portion 22 of the pressure release tube 20 (with the gasket 50, if used, in between). As a result, as seen from FIG. 4, the supporting disk 44A is secured to the pressure release tube 20 by being held or sandwiched between the bottom of the skirt section 30B of the cap securing nut 30 and the supporting flange portion 22 of the pressure release tube 20, and the mesh casing 42 is thus attached to the pressure release tube 20 or to the lower portion of the pressure release tube 20 by being secured by the cap securing nut 30.

Figure 8A:
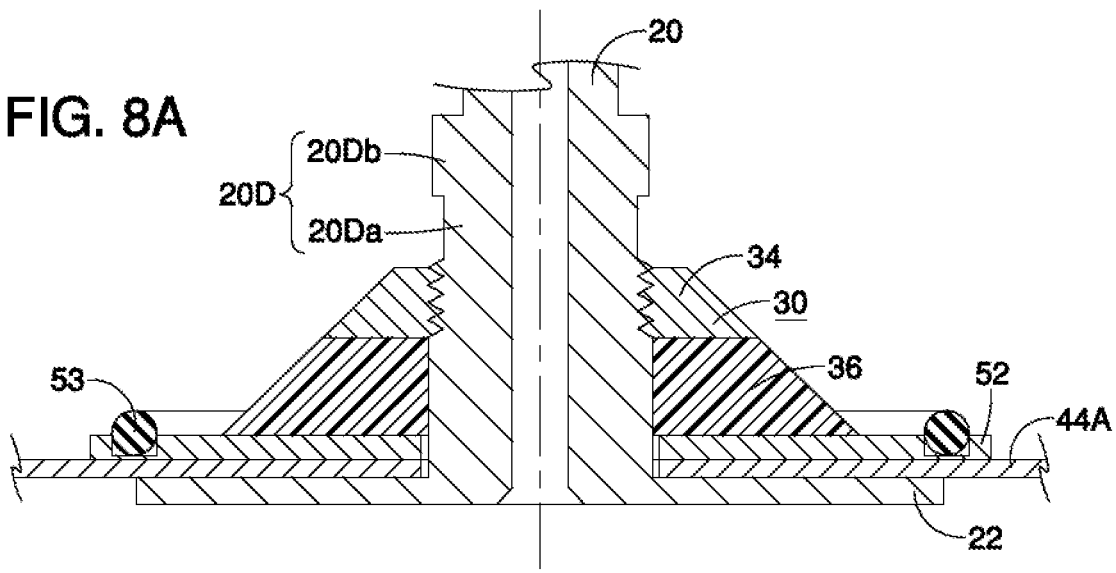
FIG. 8A is a cross-sectional partial view of a safety cap assembly for a pressure cooker according to another embodiment of the present invention.
Figure 8B:
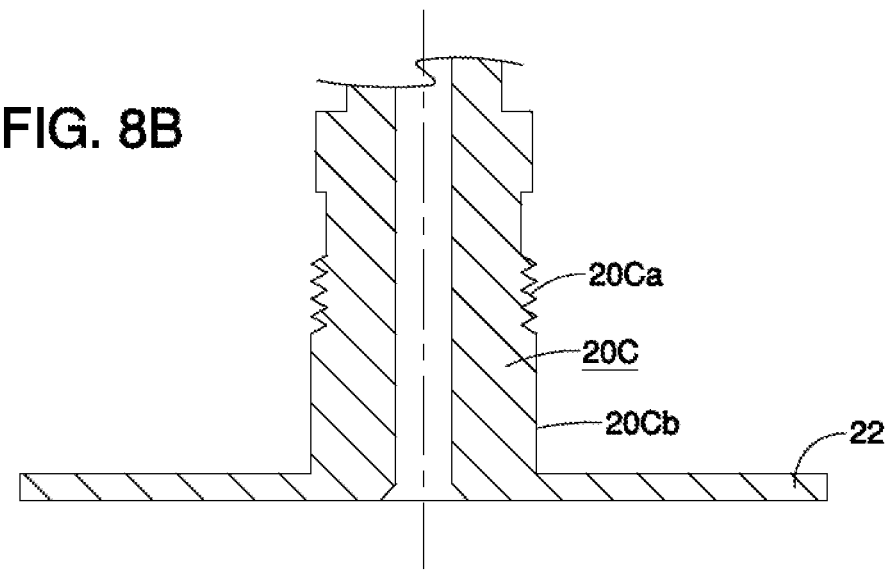
FIG. 8B is a cross-sectional partial view of the pressure release tube separated from the safety cap assembly of FIG. 8A.

In the structure of FIGS. 8A, 8B and 9, a gasket 52 is employed. The gasket 52 made of, for instance, stainless steel, is formed with a ring-shape groove 52A along its outer edge, and an O-ring 53 is fitted therein. This O-ring equipped gasket 52 can assure to make a tighter contact with the lid of a pressure cooker. Also, two gaskets (not shown), a silicon gasket and a stainless steel gasket (not shown), can be used as a substitute for the single gasket 52. In addition, as seen from FIG. 9A, it can be structured so that the O-ring 53 is press-held by the gasket 52 to provide a seal for the supporting disk 44A and a stable installation of the cap securing nut 30.

The above-described safety cap assembly 10 thus comprised of the pressure release tube 20, the cap securing nut 30 and the safety cap unit 40 is mounted to the lid of a pressure cooker, and more specifically, to a safety cap attachment adapter installed in the lid of a pressure cooker, in a manner described below.

Figure 10:
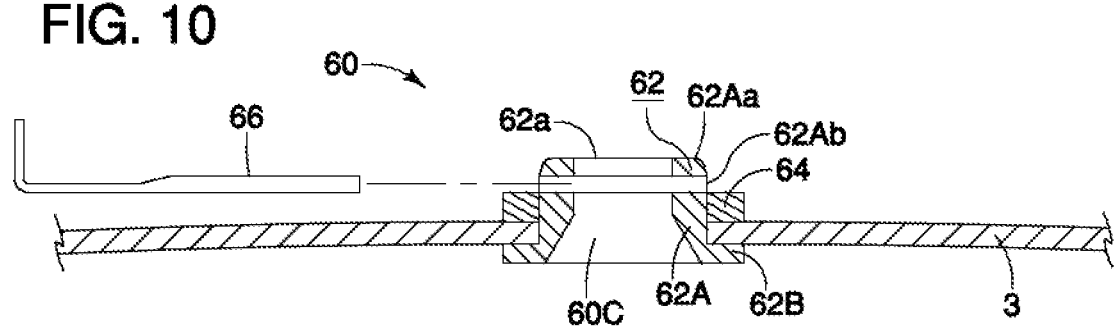
FIG. 10 is a cross-sectional view of an attachment adapter for mounting the safety cap assembly to a lid of a pressure cooker.

The safety cap attachment adapter 60 is, as seen from FIG. 10, comprised of an annular attachment nut 62, a fixing ring 64 and a sliding lock key 66. The annular attachment nut 62 and the fixing ring 64 are made of, for instance, metal, aluminum, etc. and can be made from materials having some degree of elasticity, such as a silicon, rubber, as well. The annular attachment nut 62 includes a cylindrical main section 62A and a collar section 62B. The cylindrical main section 62A has, in its inside, a receiving section 60C which is in a truncated cone shape that can snugly receive therein and mate with (the skirt section 30B of) the cap securing nut 30. The cylindrical main section 62A has thereon a guide projection 62Aa that is formed therein with, in addition to a vertical through-hole 62a for the pressure release tube 20, a locking groove 62Ab that extends horizontally, and the lock key 66 is slidably inserted in this locking groove 62Ab.

The annular attachment nut 62 in FIG. 10 is inserted from below into an attachment opening opened at substantially the center of a lid 3 of a pressure cooker, so that the upper portion of the cylindrical main section 62A of the annular attachment nut 62, including the guide projection 62Aa, is outside of the lid 3, so that the outer circumferential face of the cylindrical main section 62A is in a tight contact with the inner circumferential face of the attachment opening of the lid 3, and so that the upper surface of the collar section 62B is in tight contact with the under surface of the area surrounding the attachment opening of the lid 3. The fixing ring 64 is, typically, screwed to the outer face of the cylindrical main section 62A of the annular attachment nut 62. The attachment adapter 60 is thus securely mounted to the lid 3 of a pressure cooker.

Figure 11:
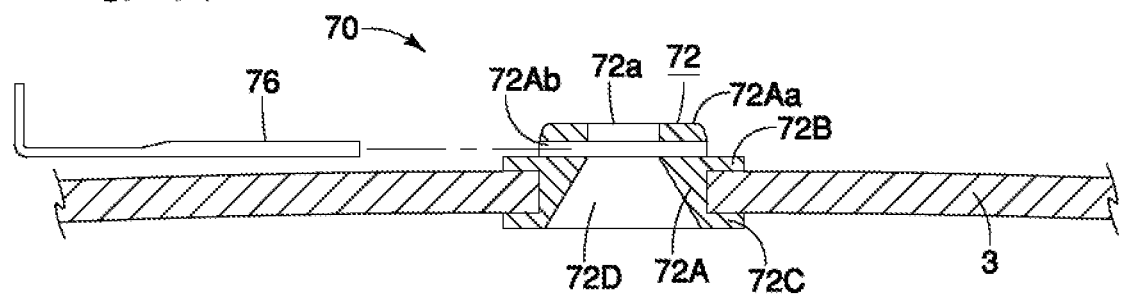
FIG. 11 is a cross-sectional view of another type of attachment adapter for mounting the safety cap assembly to a lid of a pressure cooker.

FIG. 11 shows another type of safety cap attachment adapter 70. The safety cap attachment adapter 70 of FIG. 11 is comprised of an annular attachment nut 72 and a sliding lock key 76. The annular attachment nut 72 is made from the materials having some degree of elasticity, and it includes a cylindrical main section 72A and upper and lower flange portions 72B and 72C that extend outwardly from the upper and lower ends, respectively, of the cylindrical main section 72A. The cylindrical main section 72A has thereon a guide projection 72Aa that is formed therein with, in addition to a vertical through-hole 72a for the pressure release tube, a locking groove 72Ab so that the locking groove 72Ab extends horizontally and the lock key 76 is slidably inserted in this locking groove 72Ab. The cylindrical main section 72A has, in its inside, a receiving section 72D that is in a truncated cone shape so that it can receive therein and snugly mate with (the skirt section 30B of) the cap securing nut 30.

The annular attachment nut 72 of FIG. 11 is pushed from above or below into an attachment opening opened at substantially the center of the lid 3 of a pressure cooker, utilizing the elasticity of the upper or lower flange portions 72B or 70C, so that the guide projection 72Aa is outside of the lid 3, and the outer circumferential face of the cylindrical main section 72A makes a tight contact with the inner circumferential face of the attachment opening of the lid 3, and further the lower surface of the upper flange portion 72B and the upper surface of the lower flange portion 72C also make respectively a tight contact with the upper and under surfaces of the circumferential areas surrounding the attachment opening of the lid 3. The attachment adapter 70 is thus securely mounted to the lid 3 utilizing its elasticity.

Figure 12A:
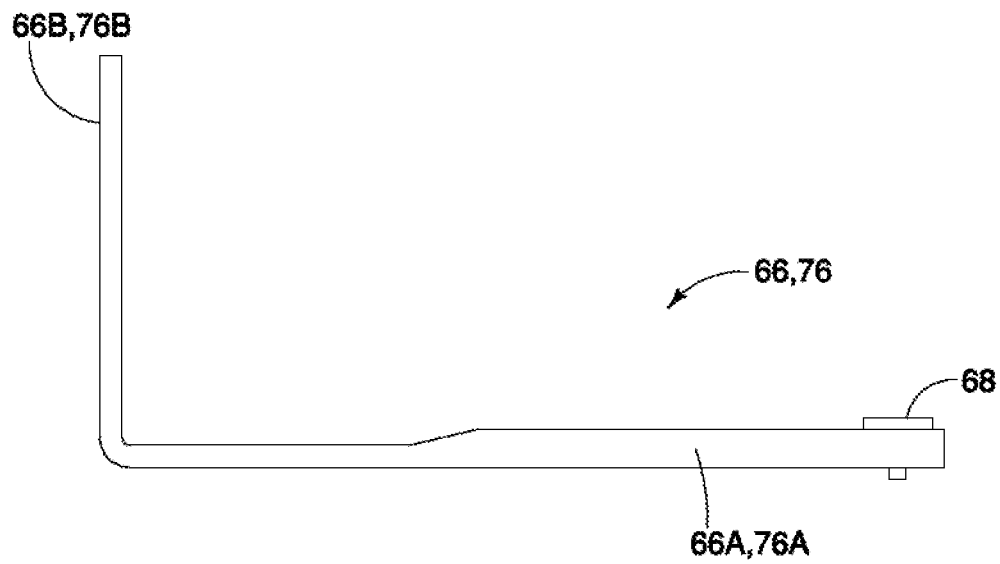
FIG. 12A is an enlarged side view of a sliding lock key of the attachment adapter.
Figure 12B:
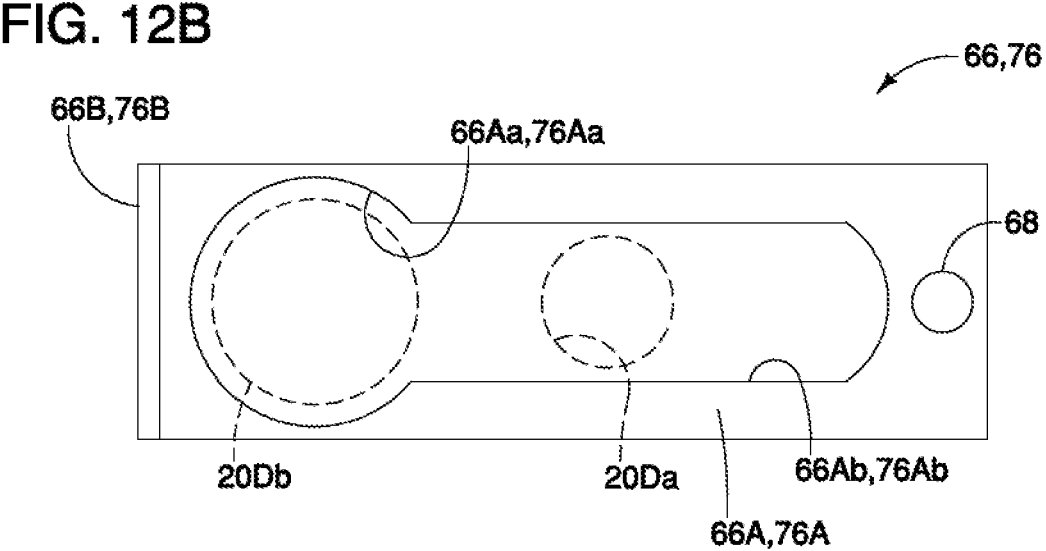
FIG. 12B is a top view thereof.

The above-described sliding lock key 66, 76, which are the same in the structure, is, as seen from FIGS. 12A, 12B, an L-shaped plate (when viewed from the side) made typically of a metal; and it is comprised of a locking portion 66A, 76A and an operating portion 66B, 76B that is bent upward at one end of the locking portion 66A, 76A.

The locking portion 66A, 76A is formed therein with a circular guide opening 66Aa, 76Aa and a linear lock opening 66Ab, 76Ab that is continuously opened from the circular guide opening 66Aa, 76Aa to extend lengthwise of the locking portion 66A, 76A. The circular guide opening 66Aa, 76Aa has a diameter that is greater than the outer diameters of the connecting section 20A and of the locking flange portion 20Db of the pressure release tube 20, and the linear lock opening 66Ab, 76Ab has a width that is smaller than the diameter of the locking flange portion 20Db and slightly larger than the outer diameter of the locking groove 20Da of the pressure release tube 20. The thus structured sliding lock key 66, 76 is, as described above, slidably inserted in the locking groove 62Ab, 72Ab of the guide projection 62Aa, 72Aa of the annular attachment nut 62, 72. The sliding lock key 66, 76 can be provided with a stopper pin 68 at the end of the locking portion 66A, 76A, so that its head is on the upper surface of the locking portion 66A, 76A and the lower end of its shank projects out of the lower surface of the locking portion 66A, 76A. The stopper pin 68 is to prevent the sliding lock key 66, 76 from being slid out of the attachment nut 62, 72.

In use of the safety cap assembly described above, the sliding lock key 66, 76 in the locking groove 62Ab, 72Ab is set in the open position (FIG. 13A) where the circular guide opening 66Aa, 76Aa is above and aligned with the receiving section 60C, 72D of the annular attachment nut 62, 72. Although FIGS. 13A through 14B illustrate the annular attachment nut 60, the annular attachment nut 70 is used in the same manner as the annular attachment nut 60. Then, the pressure release tube 20 of the safety cap assembly 10 is brought under the lid 3 of the pressure cooker. The connecting section 20A of the pressure release tube 20 is next aligned with the (center of the) receiving section 60C, 72D of the annular attachment nut 62, 72 and pushed upward or toward the annular attachment nut 62, 72, so that the connecting section 20A and the middle section 20B of the pressure release tube 20 pass through the annular attachment nut 62, 72 and are above and outside of the lid 3 and so that the cap securing nut 30 is inside the receiving section 62C, 72D of the annular attachment nut 62, 72 and makes a surface contact at its outer surface with the inner surface of the receiving section 62C, 72D.

Figure 14A:
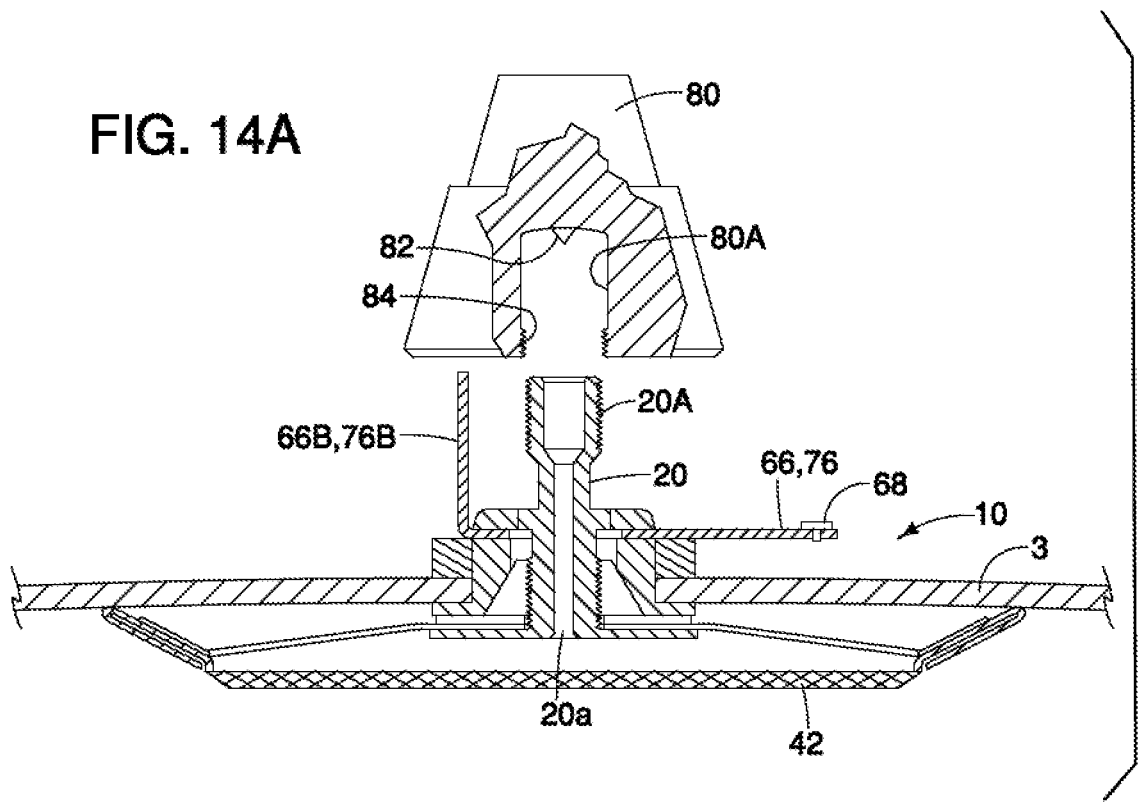
FIGS. 14A and 14B illustrate a manner of mounting a pressure adjustment weight to the safety cap assembly.
Figure 14B:
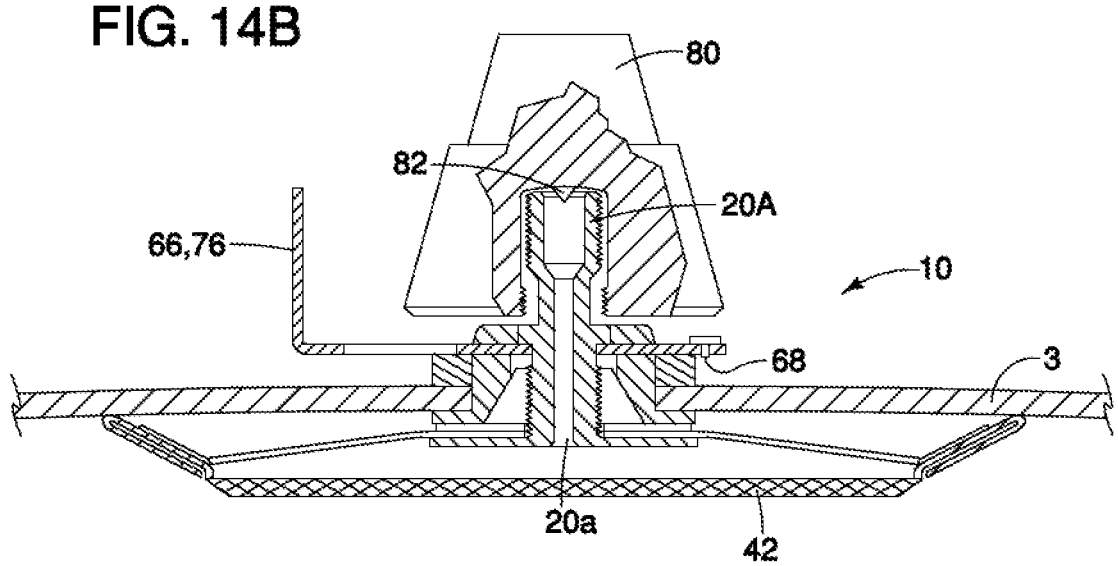

Thereafter, a pressure adjustment weight is mounted to the pressure release tube 20 as seen from FIGS. 14A and 14B. The pressure adjustment weight 80, in the shown example, is typically made of a metal, and it has a central recess 80A that is formed therein with an engagement boss 82 at its upper end. The central recess 80A is formed with an internal thread 84 in the lower portion that can engage with the external thread of the connecting part 20A of the pressure release tube 20. The internal diameter of the portion above the thread 84 is made greater than the inner diameter of the portion the internal thread 84 is formed. As seen from FIGS. 14A and 14B, the pressure adjustment weight 80 is sized so that the radius of its bottom is (at least the same or) greater than the distance between the center of the pressure release tube 20 and the operating portion 66B, 76B of the sliding lock key 66, 76 (or greater than the distance between the center of the circular guide opening 66Aa, 76Aa and the operation portion 66B, 76B of the sliding lock key 66, 76). The height of the operation portion 66B, 76B of the sliding lock key 66, 76 is at least as high as the distance between the locking groove 20Da and the top end of the connecting section 20A of the pressure release tube 20.

Figure 13A:
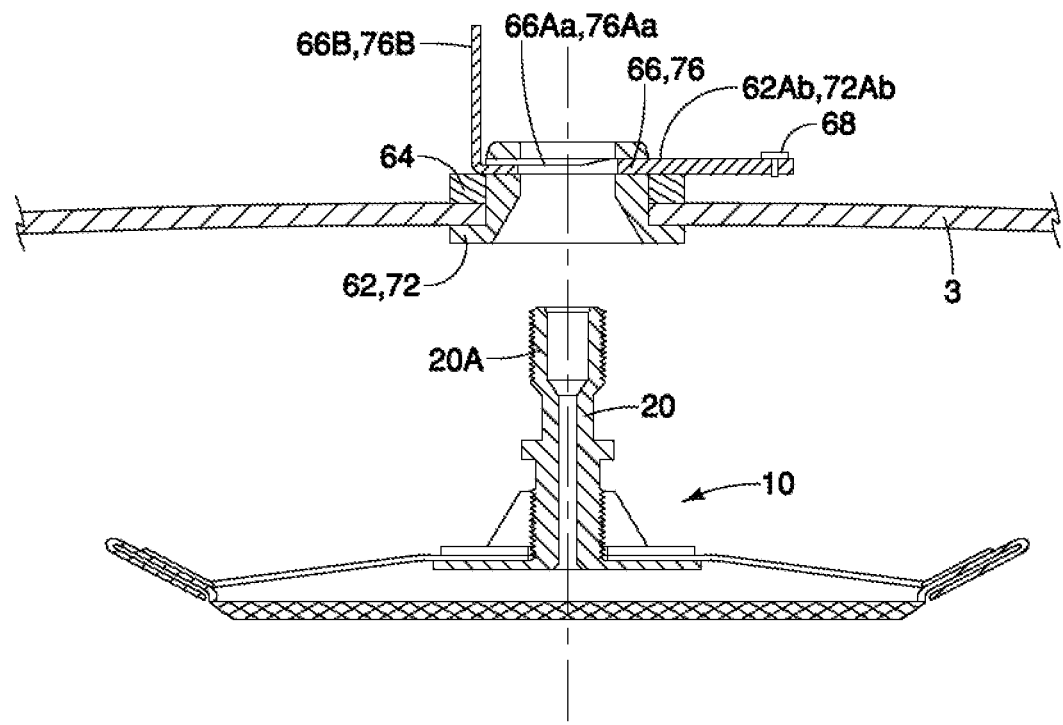
FIGS. 13A and 13B illustrate a manner of mounting the safety cap assembly to a lid of a pressure cooker.
Figure 13B:
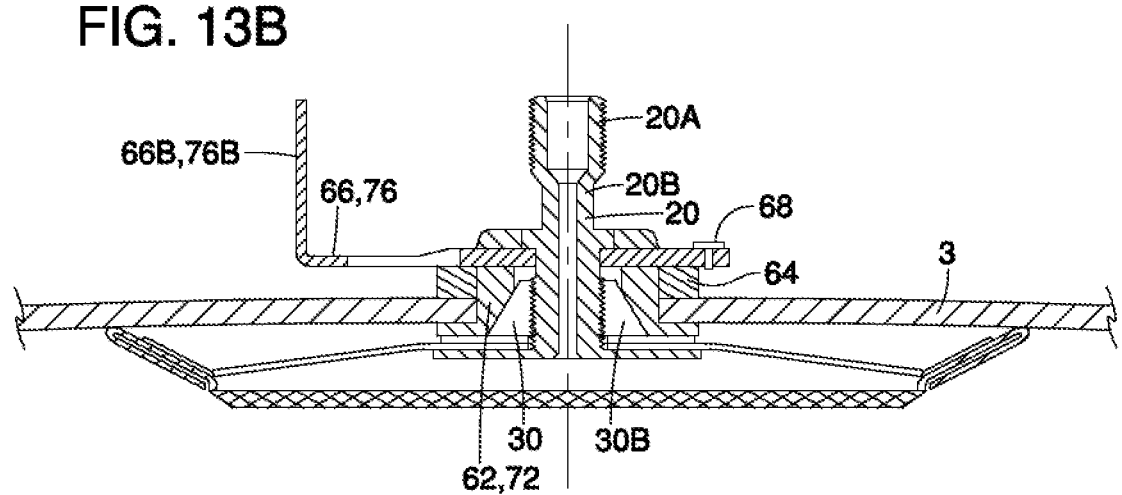

As a result, when the sliding lock key 66, 76 is in the open position shown in FIG. 13A or 14A, the pressure adjustment weight 80 comes, at its lower part, into contact with the top end of the operation portion 66B, 76B of the lock key 66, 76 and is unable to be screwed onto the pressure release tube 20.

Then, the sliding lock key 66, 76 is pulled (or moved to the left in FIG. 13A, 14A) with the operating portion 66B, 76B until the terminal end of the guide groove 66Ab, 76Ab (see FIG. 13B, 14B) comes into contact with the locking groove 20Da (see FIG. 2) of the pressure release tube 20 (or until the sliding lock key cannot be pulled any further), or at least until the locking groove 20Da is within the guide groove 66Ab, 76Ab. As a result, the safety cap assembly 10 is locked and secured to the lid 3 by the sliding lock key 66, 76 that is engaged with the locking section 20D of the pressure release tube 20; and the safety cap assembly 10 is prevented from falling by being held or supported from below at the locking flange portion 20Db of the pressure release tube 20 by the locking portion 66A, 76A of the sliding lock key 66, 76, since the width of the guide groove 66Ab, 76Ab of the sliding lock key 66, 76 is smaller than the diameter of the locking flange portion 20Db of the pressure release tube 20. In addition, since the operation portion 66B, 76B of the sliding lock key 66, 76 is not in contact with the pressure adjustment weight 80 and thus not hindered thereby, as seen from FIG. 14B, it is now possible that the pressure adjustment weight 80 is lowered (screwed down) to be set on the pressure release tube 20 in such a manner that the engagement boss 83 of the pressure adjustment weight 80 is inside the pressure release channel 20a of the connecting section 20A of the pressure release tube 20. When the pressure adjustment weight 80 is lowered, it is turned so that the internal thread 84 first engages with the external thread of the connecting section 20A and then disengages from the external thread to pass through the connecting section 20A, and the connecting section 20A enters into the portion above the thread 84 of the central recess 80A of the pressure control weight 80. Accordingly, when the pressure cooker is in use, the pressure control weight 80 is able to swing about the engagement boss 82 by the pressures (steams) released through the pressure release channel 20a of the pressure release tube 20. Once the pressure adjustment weight 80 is thus set on the pressure release tube 20, it is not removable from the pressure release tube 20 until the pressure adjustment weight 80 is turned backward and threadedly passes through the portion the internal thread 82 is formed in the central recess 80A. Accordingly, such an accident can be avoided that the pressure adjustment weight 80 (that weights, for instance, a few kilograms) is inadvertently dropped from the lid of a pressure cooker when the lid is separated from the pot of the pressure cooker after cooking is completed.

In the locked state above, the locking flange portion 20Db of the pressure release tube 20 is held from below by the sliding lock key 66, 76 (particularly by the locking portion 66A, 76A thereof) and the truncated cone shape cap securing nut 30 is inside the truncated cone shape receiving section 60C, 72D of the annular attachment nut 60, 70 so that the outer surface of the truncated cone shape portion of the cap securing nut 30 of the safety cap assembly snugly mates with and makes a tight surface contact with the interior surface of the annular attachment nut 60, 70 with its slanted circumferential exterior surface. The pressure cooker is now thus ready to be used.

Instead of the pressure adjustment weight described above, onto the connecting section 20A of the of the pressure release tube 20), a pressure control unit as seen in the U.S. Pat. No. 8,869,829) can be screw mounted, so that the pressure cooker can be used.

As cooking process progresses, the pressure inside the pot of the pressure cooker increases and pushes the safety cap assembly 10 (or the cap securing nut 30) upward or toward the annular attachment nut 60, 70 that has the slanted surface of a truncated cone shape. As a result, the cap securing nut 30 makes, due to the increased pressure, an assured and tight contact with the annular attachment nut 60, 70 with their slanted surfaces, thus forming a good and secure sealing for the pressure cooker. With the cap securing nut 30 formed from silicon or the materials having elasticity, the nut 30 (or the upper nut element 34) is able to make a tight contact with the attachment nut 62, 72, providing a good sealing effect.

FIGS. 15 to 18 show another type safety cap assembly of the present invention. In this safety cap assembly, the supporting bridge of the safety cap unit is comprised of a pair of supporting rods which are directly attached to the pressure release tube (with the supporting bridge not including the supporting disk 44A used in the structures described above). The pressure release tube 120 of this safety cap assembly is, as in the pressure release tube 20, comprised of a connecting section 120A at its upper portion, a fixing section 120C (which comprises an upper fixing section 120Ca and a lower fixing section 120Cb) at its lower portion and a middle section 120B at its middle portion or between the connecting section 20A and the fixing section 120C. It is formed with, in addition to a pressure release channel 120a, a locking groove 120Da and an outwardly extending locking flange portion 120Db as well to form a locking section as in the pressure release tube 20 described above so as to engage with the sliding lock key 66, 76.

Figure 17:
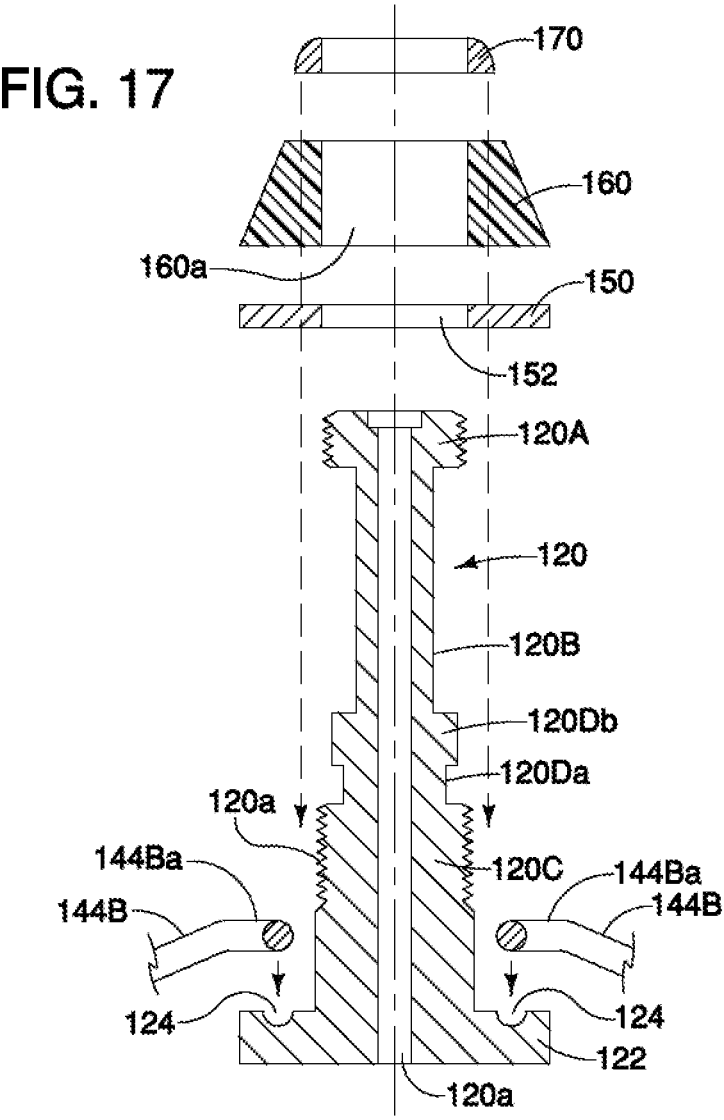
FIG. 17 an enlarged cross-sectional view of a fixing ring, a cap securing nut, a placing plate and a pressure release tube along with supporting rods of the mesh casing of the safety cap unit of FIGS. 15 and 16.
Figure 18:
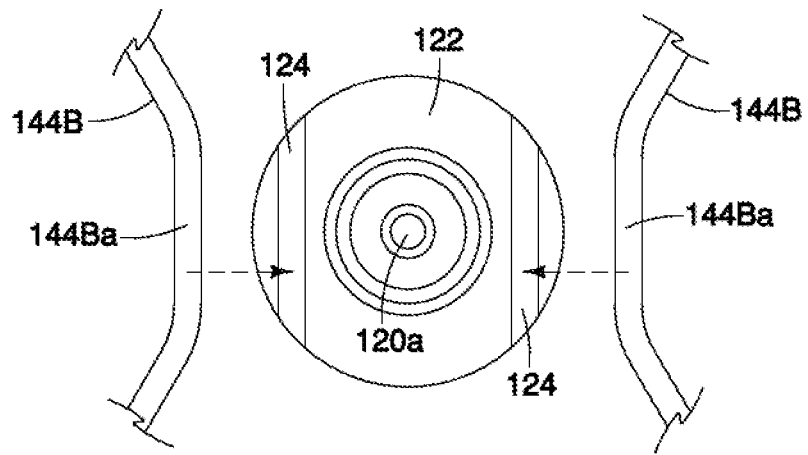
FIG. 18 is a top view of the pressure release tube, illustrating the flange portion and engagement portions of the supporting rods of the safety cap unit of FIGS. 15 and 16.

More specifically, the flange portion 122 of the pressure release tube 120 is, as seen from FIGS. 17 and 18, formed with a pair of fitting grooves 124 on its upper face. The grooves 124 are formed so that the fixing section 120C of the pressure release tube 120 is between them, so that the fitting grooves 124 extend parallel to the diameter of the flange portion 122 which is round, and they are parallel to each other as well. The grooves 124 are formed so that the supporting rods 144B (or their central engagement portions 144Ba) are snugly fitted therein. The width of each of the grooves 124 is substantially the same as the diameter of each of the supporting rods 144B (or the engagement portions 144Ba) which are typically round in cross-section, and the depth of each of the grooves 124 is substantially the same as the length of the radius of the supporting rods 144B (or the engagement portions 144Ba). The engagement portions 144Ba can be welded to these fitting grooves 142. The bottoms of the grooves 124 can be rounded.

Figure 15:
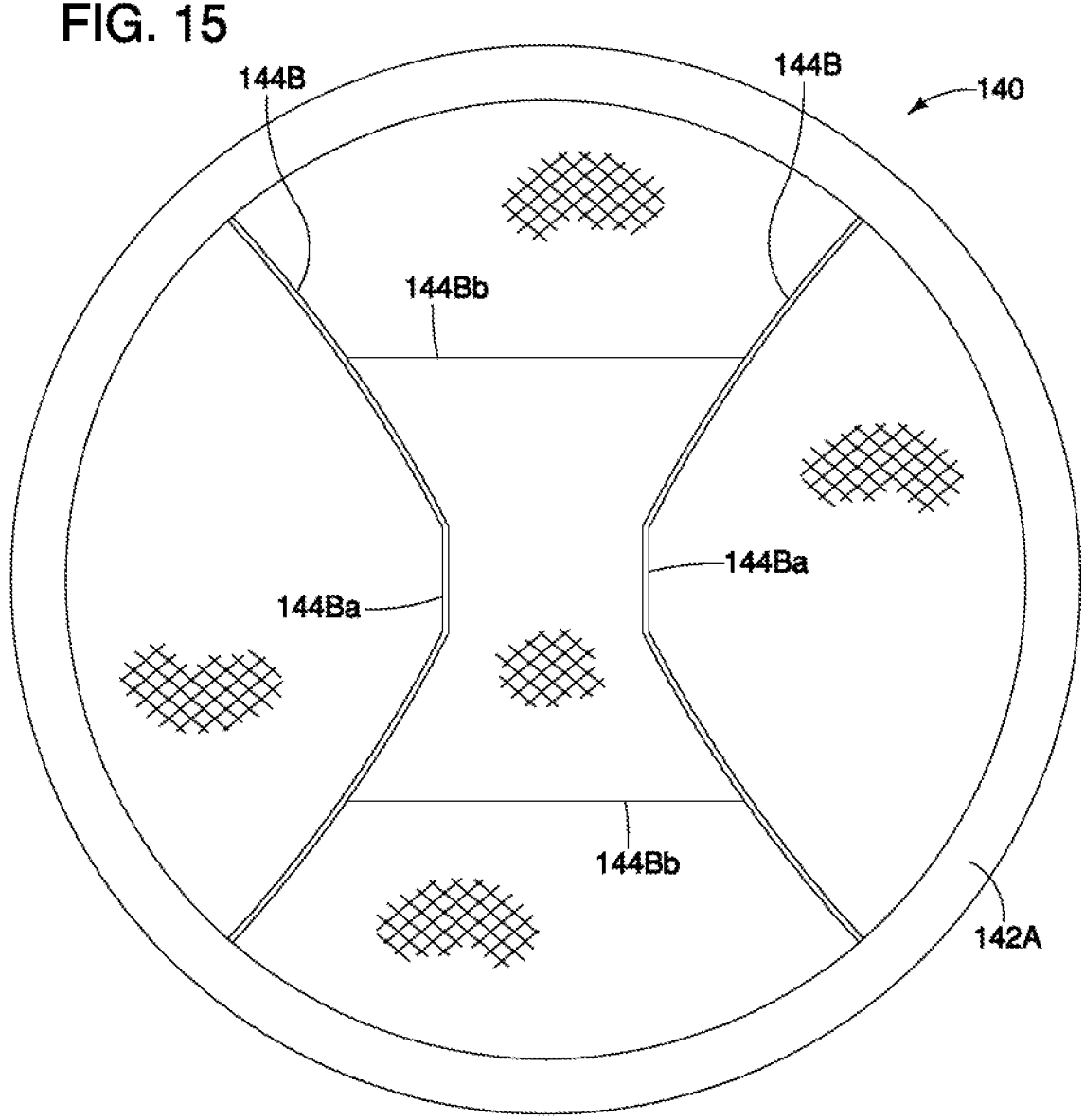
FIG. 15 is a top view of another safety cap unit according to the present invention.
Figure 16:
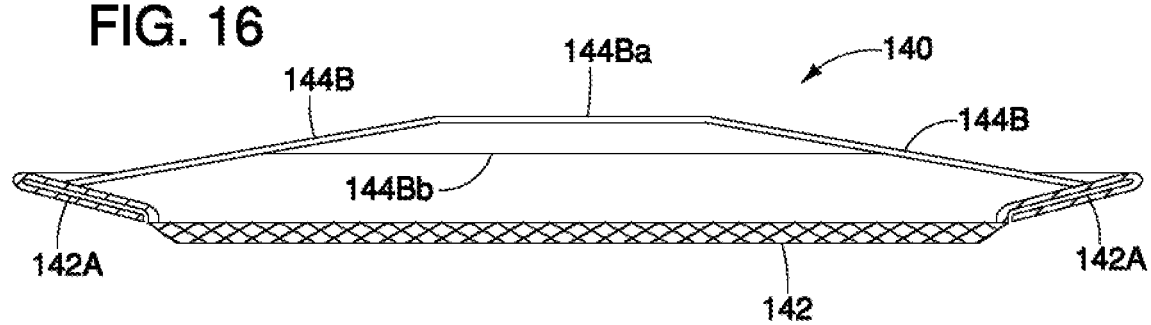
FIG. 16 is a side view of the safety dap unit of FIG. 15.

The supporting bridge comprised of the supporting rods 144B are bent upwardly, as can be seen from FIG. 16, at their central engagement portions 144Ba to take a sallow reversed V-shave when viewed from the side, so that the engagement portions 144Ba of the bent supporting rods 144B are located at or above the upper edge level of the mesh casing 142 or located outside the mesh casing 142. Both ends of each of the supporting rods 144B are attached to the circular frame 142A fixed to the mesh casing 142 by, for example, welding. The engagement portions 144Ba are straight and parallel with each other and are substantially the same as the fitting grooves 124 in the length as seen from FIG. 18. Each of the supporting rods 144B is C-shaped when viewed from above as seen from FIG. 15. Thus, each supporting rod 144B is somewhat angular flattened reversed V-shape when viewed from the side (FIGS. 16 and 17) and is somewhat angular C-shape when viewed from above (FIGS. 15 and 18) because of the straight engagement portion 144Ba which is at the middle of the supporting rod 144B. In FIG. 15, the reference number 144Bb is a reinforcement rod connecting the pair of C-shaped supporting rods 144B.

As a result, the engagement portions 144Ba of the supporting rods 144B are snugly fitted in the fitting grooves 124, so that the safety cap unit 140 is mounted on the pressure release tube 120 with the straight central engagement portions 144Ba of the supporting rods 144B inside the fitting grooves 142. The grooves 124 can be square in vertical cross-section as long as the engagement portions 144Ba of the supporting rods 144B are set inside the fitting grooves 124.

The safety cap assembly further includes a pressing plate 150 that is typically made of metal and is round in shape and is substantially the same as or larger than the flange portion 122 diametrically. The pressing plate 150 has a center hole 152 that is slightly larger than the outer diameter of fixing section 120C of the pressure release tube 120.

The safety cap unit 140 still further includes a cap securing nut 160 and a fixing ring 170 that is internally threaded.

The cap securing nut 160 is substantially the same as the cap securing nut 30. It is thus a truncated cone shape nut, and it has a trapezoidal shape when viewed from the side. The cap securing nut 160 is formed therein with an axially extending central bore 160a that opens at one (top) end and at another (lower) end thereof. The diameter of the central bore 160a of the cap securing nut 160 is substantially the same as that of the external diameter of the fixing section 120C of the pressure release tube 120.

The cap securing nut 160 is preferably made from, for instance, silicon (or materials having some degree of elasticity), so that the cap securing nut 160 is tightly fitted on the fixing section 120C of the pressure release tube 120. The cap securing nut 160 can be made of stainless steel as well. The diameter of the cap securing nut 160 gradually increases from its top end to the bottom, thus taking, as a whole, the truncated cone shape.

The cap securing nut 160 thus has a slanted circumferential exterior surface that is about 60 degrees with respect to its bottom face. The height of the cap securing nut 160 is substantially the same as that of the lower portion 120Cb of the fixing section 120C of the pressure release tube 120. The external diameter of the bottom or the lower end of the cap securing nut 160 is substantially the same as or smaller than the external diameter of the pressing plate 150. The cap securing nut 160 can be thus placed on the pressing plate 150.

The fixing ring 170 is internally threaded so as to threadedly engaged with the upper fixing section 120Ca of the fixing section 120C, in which the upper fixing section 120Ca is externally threaded.

In the structure above, the safety cap unit 140 is mounted on the pressure release tube 120 with its supporting rods 144B (engagement portions 144Ba) set in the fixing grooves 124 (see arrows in FIGS. 17 and 18) and thus engaged with the fixing grooves 124. The fixing plate 150 is then placed on the flange portion 122 (see arrows in FIG. 17) to cover both the flange portion 120 and the engagement portions 144Ba of the supporting rods 144B that are in the fixing grooves 124. The truncated cap securing nut 160 is next placed on the fixing plate 150, so that the bottom surface of the fixing plate 150 is in contact with the upper surfaces of the engagement portions 144Ba of the supporting rods 144B. The fixing ring 170 is lastly screwed to the upper fixing section 120Ca of the fixing section 120C of the pressure release tube 120 and tightened. As a result, the safety cap unit 140 is securely mounted on the pressure release tube 120 with its supporting rods 144B engaged within the fitting grooves 124 formed in the flange portion 122, thus forming the safety cap assembly; and the pressure release tube 120 having the safety cap unit 140 is mounted to the lid of a pressure cooker as in the same manner (using the safety cap attachment adapter 60, 70, the sliding lock key 66, 76, etc.) as in the safety cap assembly described above.

Furthermore, in the present invention, instead of the pressure adjustment weight 80 (or the pressure control unit), a vacuum adapter can be mounted on the pressure release tube 20 of the safety cap assembly.

Figure 19:
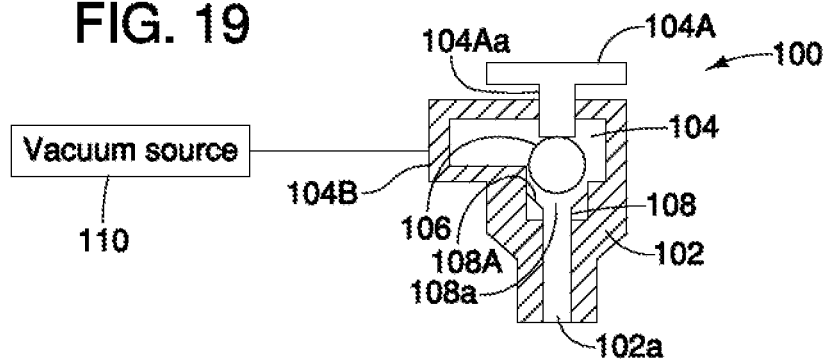
FIG. 19 is a cross-sectional view of a vacuum adapter to be mounted to the safety cap assembly of the present invention.
Figure 20A:
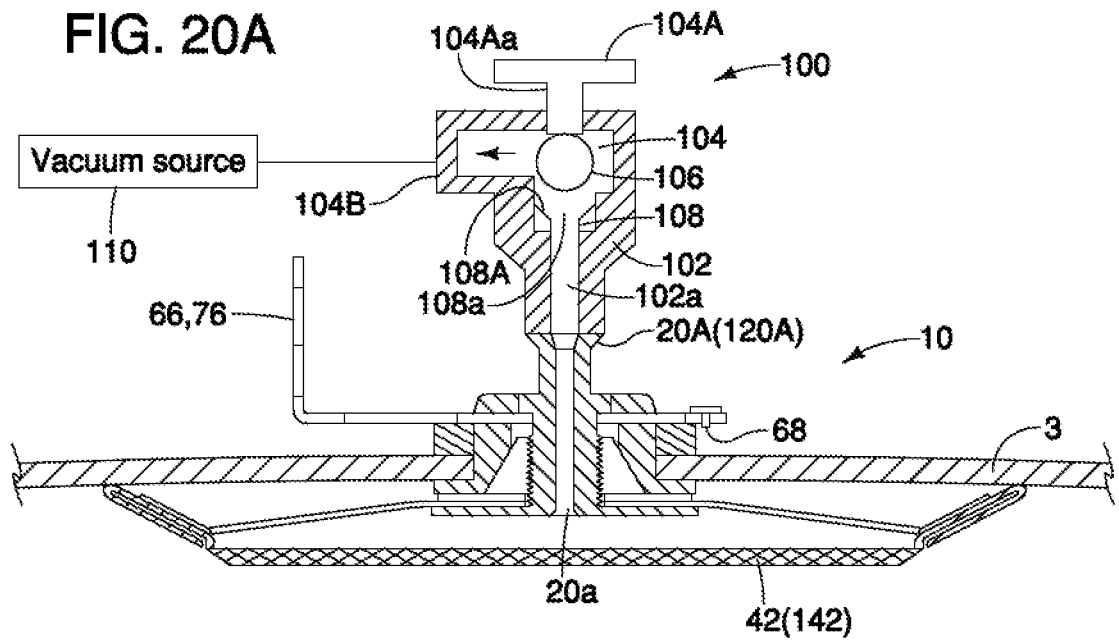
FIGS. 20A and 20B illustrate the manners of operation of the vacuum adapter.

As seen from FIG. 19, a vacuum adapter 100 is comprised of a cylindrical main casing 102 that is formed therein with an axially extending vacuum channel 102a and a vacuum control chamber 104. The axially extending vacuum channel 102a has substantially the same diameter as the internal diameter of the connecting section 20A (120A) of the pressure release tube 20 (120), and it is formed with an internal thread in the lower portion so as to be screwed to the connecting section 20A (120A). The vacuum control chamber 104 is in the upper portion of the main casing 102 and communicates at its bottom with the vacuum channel 102a. The cylindrical main casing 102 is provided with a twist knob 104A in the top wall. The twist knob 104A has a pressing projection 104Aa formed on its under face, and this pressing projection 104Aa is provided so as to extend into the inside of the vacuum chamber 104. The vacuum chamber 104 has a connecting port 104B in the side wall, so that the vacuum chamber 104 is connectable to a vacuum source (vacuum pump) 110 at the connecting port 104B. Inside of the vacuum control chamber 104 is provided with a plugging ball 106 typically made of a stainless steel, having a diameter greater than the diameter of the vacuum channel 102a. The connecting port 104B of the vacuum chamber 104 is formed so as to prevent the plugging ball 106 from moving out of the vacuum chamber 104. In the bottom of the vacuum control chamber 104, a cylindrical block washer 108 made of, for instance, silicon is securely installed (by glue, or by its elasticity, for instance). The upper end face of this block washer 108 is recessed in a reversed cone shape (or in a triangle shape in a vertical cross-section), so that the plugging ball 106 can sit in the center of the bottom of this recess 108A (see FIG. 20A). The block washer 108 is formed with a central hole 108*a* that has substantially the same diameter as the vacuum channel 102*a* of the main casing 102.

Figure 20B:
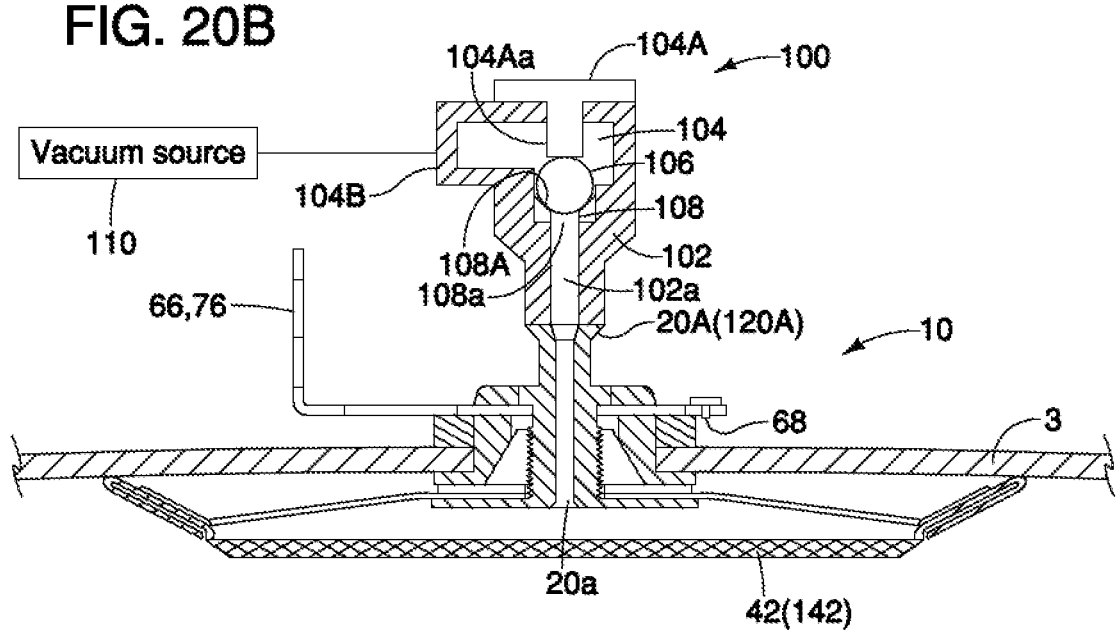

In use, the vacuum adapter 100 is screwed to the connecting section 20A of the pressure release tube 20 of the safety cap assembly 10 mounted to the lid of a pressure cooker in which the foodstuff is placed. When the vacuum source (vacuum pump) 110 connected to the vacuum control chamber 104 is activated, as seen from FIG. 20A, the plugging ball 106 is lifted by the vacuum suction to open up the central hole 108*a* of the block washer 108 and the vacuum channel 102*a* of the main casing 102, so that as shown by the upward arrow the air inside the pressure cooker is drawn out through the vacuum channel 102*a* of the main casing 102 and the central hole 108*a* of the block washer 108 with the plugging ball 106 being lifted in the vacuum control chamber 104, thus creating a vacuum environment inside the pressure cooker. When the operation of the vacuum pump 110 is stopped, the lifted plugging ball 106 drops from its lifted position into the recess 108A of the block washer 108 to close (or plug) the central hole 108*a* and the vacuum channel 102*a*. The twist knob 104A is then turned manually, so that as seen from FIG. 20B the lower end of the pressing projection 104A of the twist knob 104A comes into contact with the plugging ball 106 and presses the ball 106 against recess 108A of the block washer 108. Since the block washer 108 is made of the material that has some elasticity, such as silicon, the plugging ball 106 is assuredly pressed against the recess 108A of the block washer 108 and makes a tight seal of the vacuum channel 102*a* of the main casing 102. As a result, with the stainless steel ball 106 closing the pressure release channel 20*a* of the pressure release tube 20, the inside of the pot is kept vacuumed.

The vacuum lowers the temperature inside the pressure cooker and extracts water inside the foodstuff; accordingly, it is possible to perform freeze/dry vacuum cooking to the foodstuff placed in the pressure cooker. In addition, when a pressure cooker that is, for instance, made of an SS 430 stainless steel clad metal at its bottom is used, by heating the pot thereof, the pot, particularly the bottom, emits far-infrared-rays, and vacuum cooking that utilizes the emitted far-infrared-rays so to be radiated to the foodstuff in the pot is accomplished under the vacuum environment. With a pressure cooker having the bottom of an SS 430 stainless steel clad metal, an induction heating can be realized, and vacuum heat cooking for foodstuff that utilizes far-infrared-rays, which is a different cooking process from freeze/dry vacuum cooking, is made possible.

In the structures described above, the cap securing nut 30 (160) of the safety cap assembly has a truncated cone shape; nonetheless, it can take any other shape including a dome shape with a curved surface, a truncated pyramid shape with a plurality of flat circumference surfaces, etc., so that the annular attachment nut that receives the cap securing nut has a corresponding shape of a curved surface, a truncated pyramid shape, etc.

As seen from the above, the safety cap assembly of the present invention is a single body formed by the assembled pressure release tube, cap securing nut and safety cap unit; and the supporting bridge of the safety cap unit, or at least the central portion of the supporting bridge, is outside of the mesh casing. Accordingly, the distances from the lower end opening of the pressure release channel to any points of the mesh casing varies, and the food particles are caught by the mesh casing. Accordingly, clogging of the pressure release channel of the pressure release tube is prevented, avoiding explosion of pressure cookers. The safety cap assembly is mounted to the lid of a pressure cooker by way of taking steps of bringing the truncated cone shape nut to the truncated cone shape receiving section of the attachment adapter, setting a pressure control weight on the pressure release tube, pulling the sliding lock key, and then attaching the pressure control weight to the pressure release tube. Without taking all of these steps, the pressure cooker cannot be used as a pressure cooker, and accidents can be prevented. In addition, with the cap securing nut that is in a truncated cone shape, the safety cap assembly provides an assured sealing for the pressure cooker cooking; and with the vacuum adapter attached thereto, an appropriate vacuum environment can be created inside the pressure cooker, allowing the pressure cooker to be used for vacuum cooking. Further, since the safety cap assembly is simple in structure, it can be easily cleaned, assuring the safe and sanitary use of a pressure cooker. In addition, since the safety cap assembly is simple in structure and can be mounted on and removed from the lid of a pressure cooker easily, they can be designed in any desired size, so that they can be used in even a large scale cooking pot such as a stock pot.

The invention claimed is:

1. A safety cap assembly for a pressure cooker, comprising:
   a pressure release tube formed therein with an axially extending pressure release channel and formed with an outwardly extending flange portion at a lower end thereof,
   a cap securing nut which is in substantially a truncated cone shape with an outer diameter thereof gradually increasing from a top end to a bottom end thereof and is configured to be attached to a lower portion of said pressure release tube, and
   a safety cap unit comprised of a mesh casing and a supporting bridge and configured to be attached to the lower portion of said pressure release tube, a central portion of said supporting bridge being substantially outside of said mesh casing and held by said cap securing nut and said outwardly extending flange portion.

2. The safety cap assembly according to claim 1, wherein said cap securing nut is threadedly attached to the lower portion of said pressure release tube.

3. The safety cap assembly according to claim 1, wherein said supporting bridge is comprised of a supporting disk and a pair of supporting rods attached at central portions thereof to said supporting disk and at both end thereof to said mesh casing, said supporting rods being bent upwardly at central portions thereof.

4. The safety cap assembly according to claim 1, wherein
   said flange portion is formed with a pair of parallel fitting grooves,
   said supporting bridge is comprised of a pair of supporting rods with engagement portions thereof fitted in said fitting grooves; and
   a pressing plate is provided between said cap securing nut and said outwardly extending flange portion.

5. The safety cap assembly according to claim 4, further comprising an attachment adapter configured to be engaged with the cap securing nut, the attachment adapter comprising:

an annular attachment nut configured to be mounted to a lid of a pressure cooker; and a lock key slidably provided in said annular attachment nut so as to engage with a locking groove which is formed on said pressure release tube.

6. The safety cap assembly according to claim 5, wherein the lock key is substantially an L-shaped plate having an a locking portion and an operating portion that is bent upward at one end of the locking portion, and wherein the locking portion is formed with a circular guide opening and a linear lock opening that is continuously opened from the circular guide opening.

7. The safety cap assembly according to claim 1, further comprising an attachment adapter configured to be engaged with the cap securing nut, the attachment adapter comprising:

an annular attachment nut configured to be mounted to a lid of a pressure cooker; and a lock key slidably provided in said annular attachment nut so as to engage with a locking groove which is formed on said pressure release tube.

8. The safety cap assembly according to claim 7, wherein the lock key is substantially an L-shaped plate having an a locking portion and an operating portion that is bent upward at one end of the locking portion, and wherein the locking portion is formed with a circular guide opening and a linear lock opening that is continuously opened from the circular guide opening.

9. The safety cap assembly according to claim 1, wherein said cap securing nut is comprised of an upper nut element and a lower nut element, each being in substantially a truncated cone shape with an outer diameter thereof gradually increasing from a top end to a bottom end thereof, and when combined with each other being in substantially a truncated cone shape with an outer diameter thereof gradually increasing from a top end of said upper nut element to a bottom end of said lower nut element.

10. The safety cap assembly according to claim 9, wherein said upper nut element is threadedly attached to said pressure release tube with said lower nut element underneath.

11. The safety cap assembly according to claim 1, further comprising a pressure adjustment weight configured to be mounted to the pressure release tube, the pressure adjustment weight being formed with a central recess which is formed a thread in a lower portion thereof.

12. The safety cap assembly according to claim 1, wherein a vacuum adapter is provided thereon, wherein the vacuum adapter comprises:

a main casing formed therein with an axially extending vacuum channel, a vacuum control chamber formed in an upper portion of the main casing and provided with a connecting port configured to be connected to a vacuum source, a block washer having a central bore and provided in the vacuum control chamber, a twist knob provided on the main casing and having a pressing projection extending into the vacuum control chamber, and a plugging ball provided in the vacuum control chamber.

* * * * *